US007340620B2

(12) United States Patent
Dove

(10) Patent No.: US 7,340,620 B2
(45) Date of Patent: Mar. 4, 2008

(54) RAPID LOAD REDUCTION FOR POWER-OVER-LAN SYSTEM USING LOWER AND HIGHER PRIORITY STATES FOR PORTS

(75) Inventor: Daniel Joseph Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 11/126,479

(22) Filed: May 10, 2005

(65) Prior Publication Data

US 2006/0259792 A1    Nov. 16, 2006

(51) Int. Cl.
*G06F 1/00*    (2006.01)

(52) U.S. Cl. .......................................... 713/300; 714/14
(58) Field of Classification Search ................. 713/300
See application file for complete search history.

(56) References Cited

U.S. PATENT DOCUMENTS

| | | | | |
|---|---|---|---|---|
| 4,611,289 | A | * | 9/1986 | Coppola ..................... 713/300 |
| 5,319,571 | A | * | 6/1994 | Langer et al. ............... 713/300 |
| 5,381,554 | A | * | 1/1995 | Langer et al. ................. 714/14 |
| 5,949,974 | A | * | 9/1999 | Ewing et al. ................ 709/202 |
| 6,473,608 | B1 | * | 10/2002 | Lehr et al. ................... 455/402 |
| 6,762,675 | B1 | * | 7/2004 | Cafiero et al. ............ 340/10.42 |
| 7,043,647 | B2 | * | 5/2006 | Hansen et al. .............. 713/320 |
| 7,155,622 | B2 | * | 12/2006 | Mancey et al. ............. 713/324 |
| 7,203,849 | B2 | * | 4/2007 | Dove .......................... 713/300 |
| 2002/0144159 | A1 | * | 10/2002 | Wu et al. .................... 713/300 |
| 2003/0099076 | A1 | | 5/2003 | Elkayam et al. |
| 2003/0107269 | A1 | | 6/2003 | Jetzt |
| 2005/0086543 | A1 | * | 4/2005 | Manuell et al. ............. 713/300 |
| 2006/0112288 | A1 | * | 5/2006 | Schindler .................... 713/300 |
| 2006/0149978 | A1 | * | 7/2006 | Randall et al. ............. 713/300 |

OTHER PUBLICATIONS

Hewlett Packard, "Proliant BL e-Class -retired", accessed Jul. 12, 2006, pp. 1-2.*
"Quad Integrated Power Sourcing Equipment Power Manager", TPS2384, Nov. 2004 (Rvsd Dec. 2004), pp. 1-44, Texas Instruments Incorporated, Texas.

* cited by examiner

*Primary Examiner*—Chun Cao

(57) ABSTRACT

One embodiment described relates to a method of rapidly reducing load for a power-over-ethernet system under fault conditions. Ports are pre-configured to either of a lower priority state or a higher priority state. A load reduction signal is received. The load reduction is performed by rapidly shutting-off power to the ports in the lower priority state while maintaining power to the ports in the higher priority state. Other embodiments are also described.

14 Claims, 2 Drawing Sheets

RAPID LOAD REDUCTION FOR POWER-OVER-LAN SYSTEM USING LOWER AND HIGHER PRIORITY STATES FOR PORTS

BACKGROUND OF THE INVENTION

1. Field of the Invention

The present invention relates generally to networking and communications technology.

2. Description of the Background Art

In the last few years, a technology has become adopted within the industry called Power over Ethernet (PoE) or Power over LAN. This technology allows local area network (LAN) devices to obtain power through the same data cable as they receive their network packets. Power is injected into the wiring pairs in a way that does not interfere with the signal quality of the LAN packets. This technology is gaining popularity as people see it useful for powering Internet Protocol (IP) telephones, Wireless Access Points (WAPs), and other remote devices that do not take a lot of power, and which are located in places where power distribution may be problematic.

The PoE technology enables the terminals, termed powered devices (PDs), to receive their operating power over the same Ethernet LAN connection that they use for data communication. It thus eliminates the need to connect each terminal to an AC power socket, and hence also eliminates the need to provide each terminal with its own AC/DC power converter.

The PoE technology also enables PDs to be recognized as such by a "signature" generated by the terminal. The LAN MAN Standards Committee of the IEEE Computer Society is developing specifications for Power over LAN systems, as described in IEEE Drafts P802.3af/D3.0 or later, entitled "Data Terminal Equipment (DTE) Power via Media Dependent Interface (MDI)" (IEEE Standards Department, Piscataway, N.J., 2001), which is also incorporated herein by reference. The specifications are referred to herein as standard 802.3af.

A PoE system may include an Ethernet switch and a power hub (Power Sourcing Equipment or PSE), which serves as the DC power source, along with a number of PD terminals, which communicate via the switch and draw power from the hub. The system is typically connected in a star topology, with each terminal linked by a cable to the switch and hub. The power hub in one chassis may be integrated with the switch in a second chassis, in a console containing both chassis, in what is known as an "end-span" configuration. Alternatively, the power hub chassis may be located between the switch chassis and the terminals, in a "mid-span" configuration. DC power is carried to the loads (i.e., the terminals) over twisted pairs provided by Category 5 cabling. The end-span configuration uses twisted-data-pairs that are also used for Ethernet communication; the mid-span configuration uses spare twisted-spare-pairs that are not used for Ethernet communication.

SUMMARY

One embodiment of the invention pertains to a method of rapidly reducing load for a power-over-ethernet system under fault conditions. Ports are pre-configured to either of a lower priority state or a higher priority state. A load reduction signal is received. The load reduction is performed by rapidly shutting-off power to the ports in the lower priority state while maintaining power to the ports in the higher priority state.

Another embodiment of the invention pertains to a system for power distribution to network devices. The system includes a plurality of ports enabled to supply power to network devices connected thereto. Priority data is associated with each said port for assigning a priority state to the associated port. Circuitry is configured so as to rapidly shut off power only to the ports with a lower priority state upon receiving a selective power reduction signal, while power to the ports with a higher priority state is maintained.

Another embodiment of the invention pertains to a power management apparatus for supplying power to network devices by way of local area network (LAN) ports. The apparatus includes at least one pin configured to receive power and a plurality of pairs of load sense and return pins. Each pair of load sense and return pins is configured to be coupled to a LAN port. A plurality of port control registers are also included. Each port control register is associated with a specific port and is configured with priority data indicating whether the specific port is to have its power maintained or shut-down after receiving a signal indicating a power supply failure.

Other embodiments are also described.

DETAILED DESCRIPTION

Figure 1:
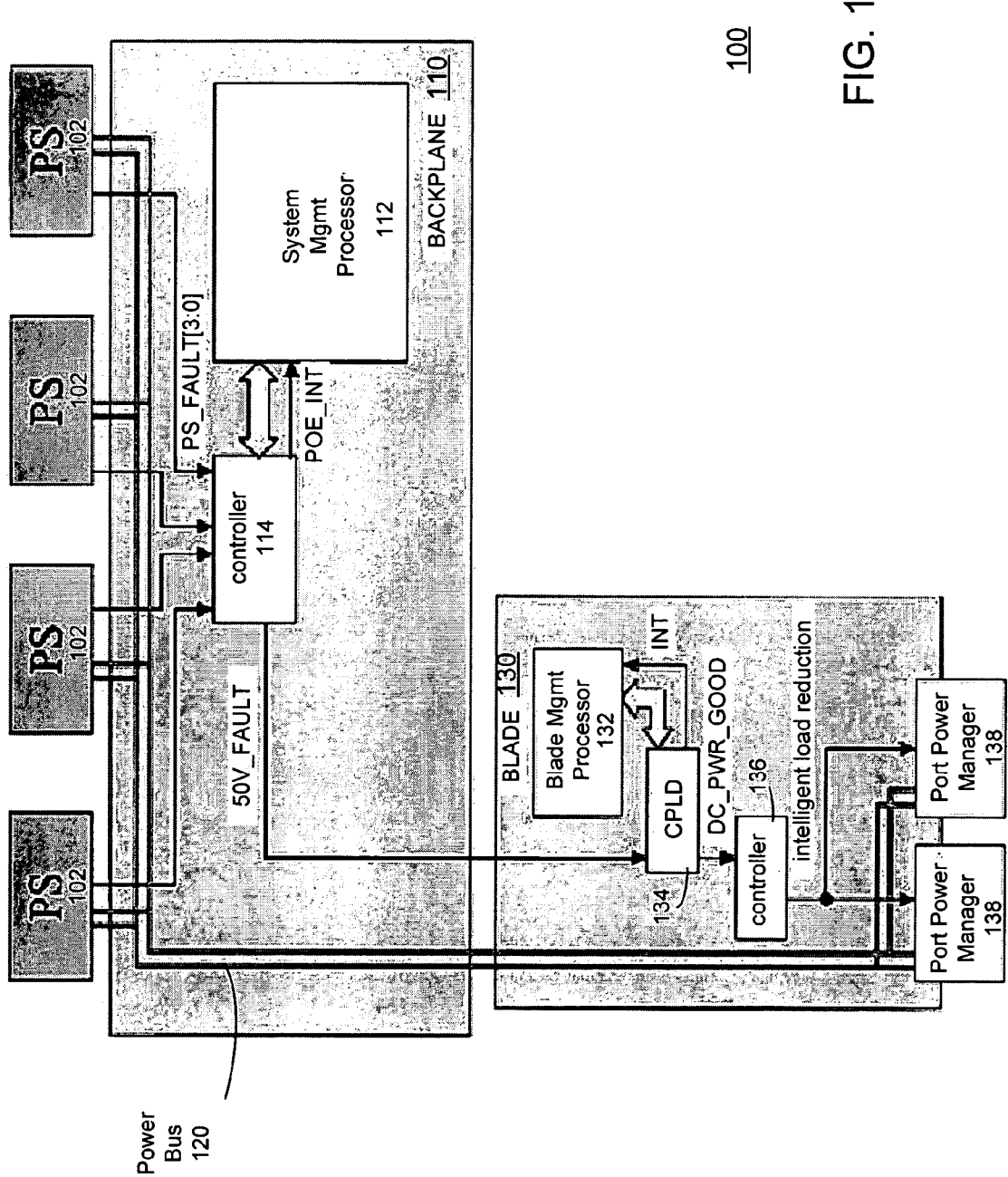
FIG. 1 is a block diagram depicting a system for distributing power through network ports in accordance with an embodiment of the invention.

Since the IEEE 802.3af standard for PoE was ratified, practical problems and disadvantages have been discovered in systems implementing it.

In particular, distributing the desired quantities of power within PoE-enabled network switches has been found to be problematic. Each PoE device may take up to 15.4 watts (W) of power from the system. Hence, for a 256 port PoE-enable switch, which is not an uncommon port density, the PoE power capacity has to be almost 4 kilowatts (KW). Distributing the electrical current to supply 4 KW of power within a network switch is a substantial design issue.

In addition, redundancy is often desired, so that when a power supply fails, the system continues to run without any observed loss in performance. In our 256 port switch example, providing redundancy for the 4 KW of power may require another 4 KW of power for a total of 8 KW in total PoE power supply capacity.

One approach to address the issues of power distribution and redundancy is to provide power through a power multiplexer. Such a power multiplexer approach enables the efficient sharing and distribution of power supply capacity. However, previous implementations of the power multiplexer approach have had their own problems and disadvantages.

For example, previous implementations of the power multiplexer approach provided for shutting down power to specific "lower priority" network ports upon failure of a power supply unit, instead of shutting down power to all network ports. However, the time required to reduce power at the specified ports under previous implementations is limited to a non-trivial minimum value. This lag time to shut down specified ports may be on the order of tens of milliseconds for a large system with many ports. The lag time is due to the use of a microcontroller to write each port individually so as to instruct the port to stop supplying power.

During the lag time, the working power supplies are vulnerable to overload because power to the "lower priority" ports has not yet been shut off. Most power supplies can sustain a momentary overload, but they will "crow-bar" when that load exceeds their rating for an excessive time.

In order to avoid such overloading, prior implementations use large output capacitors, on the order of hundreds of microfarads, on the power supply to hold the PoE system voltage up until the power is reduced at the load by the shutting off of power to the lower priority ports. Unfortunately, these large capacitors take board space, add substantial cost (on the order of a dollar each), and reduce reliability of the system. Furthermore, a system with more ports would require even larger capacitors.

As discussed further below, an embodiment of the present invention advantageously enables the rapid detection, communication, and reduction of overload conditions so that operations of a PoE supply system may remain stable in the event of failure of power supply components. By enabling the rapid controlled shut down of pre-selected ports, the PoE supply system is able to allocate all or most of its power supplies to active delivery of power, rather than having some of the power supplies being on stand-by as backups for redundancy.

An embodiment of the present invention provides a low-latency process for shutting down power to individual ports of a PoE supply system. The latency of shutting down power to individual ports may be below a millisecond or below a tenth of a millisecond (in comparison with tens of milliseconds in the previous solution). By rapidly shutting down power to ports that are deemed "low priority" ports, the load on the power supplies may be reduced in a way that prevents them from exceeding their rated current for too long. Hence, failure (crow-bar) of power supplies may be avoided while shutting down pre-selected "lower priority" ports. Furthermore, this is accomplished without the need for large bulk output capacitors, saving printed circuit board space and cost, and increasing reliability.

For example, consider a PoE supply system with two 1,000 W power supplies. Conventionally, one 1,000 W supply may be actively used to deliver power, and the other 1,000 W supply may be on stand-by as a backup for redundancy. Using an embodiment of the present invention, both 1,000 supplies may be actively used to deliver 2,000 W of power. If one supply failed, then power may be shut-off to pre-selected "lower priority" network ports in a rapid manner so that the load does not exceed the rating on the single supply that is still working. The single supply will continue to provide 1,000 W to the "higher priority" network ports. Hence, in effect, the higher priority 1,000 W of load will be redundantly supplied, while the lower priority ports receive power when the system is at full capacity.

FIG. 1 is a block diagram depicting a system 100 for distributing power through network ports in accordance with an embodiment of the invention. The system 100 may be, for example, part of a multi-port Ethernet switch or other network apparatus.

As shown in FIG. 1, the system 100 includes multiple power supplies (PS) 102, a backplane or other system board 110 and a plurality of blades 130 communicatively coupled to the backplane (one blade being depicted). In this example, a power bus 120 is coupled to each of the power supplies 102 and transmits power from the power supplies 102 to the blades 130.

The backplane 110 may be configured with a system management microprocessor (μprocessor) 112 and a controller 114. The controller 114 may be implemented using a complex programmable logic device (CPLD). In other embodiments, the functionality performed by the backplane 110 may be implemented with other specific components and circuitry.

Each blade 130 may be configured with a blade management microprocessor (Blade Mgmt μprocessor or BMP) 132, a CPLD 134, a controller 136 and port power managers 138. In other embodiments, the functionality performed by the blade 130 may be implemented with other specific components and circuitry.

In one embodiment, each working power supply 102 may provide an equal proportion (for example, a fraction such as 30%) of its maximum capacity. In other words, each supply 102 may provide substantially the same fraction (the current load divided by the total working capacity at that time) of its maximum capacity. The system 100 may be configured with power supplies 102 of equal capacity, so that each working power supply provides an equal amount of the current to the load. Alternatively, the system 100 may be configured to accommodate power supplies of differing capacity.

Each power supply 102 may be configured with the capability to communicate to the controller 114 on the backplane 110 as to whether or not the power supply 102 is operating properly. In the embodiment shown in FIG. 1, this operational status may be communicated via the four power supply fault signals, PS_FAULT[3:0].

Logic within the controller 114 may be configured to send a fault signal to the blades 130 immediately upon being notified that a supply 102 has failed. In one specific embodiment, the fault signal may comprise assertion of a hardware signal, such as a 50 volt signal (50V_FAULT), by the controller 114 on the backplane 110, where the asserted hardware signal is received by the CPLD 134 on each blade 130, as shown in FIG. 1. Other fault signaling mechanisms may be utilized.

In addition, the controller 114 may be configured to generate an interrupt to the system management processor (SMP) 112 to indicate that a supply fault has occurred.

The assertion of the fault signal by the controller 114 is received by circuitry within each blade 130. Upon receipt of the fault signal, an internal signal within the blade 130 may be provided so as to indicate to relevant components in the blade 130 that a reduction in load is necessary. In one specific embodiment, the internal signal within a blade 130 comprises de-assertion of a DC_PWR_GOOD signal by the CPLD 134 to the controller 136, as shown in FIG. 1. Other signaling mechanisms may be utilized.

Upon de-assertion of the internal signal, the controller 136 may be configured to assert an intelligent or selective load reduction signal to power management circuitry 138 for the PoE-enabled network ports of the system 100. In one embodiment, separate power management circuitry may be included for each PoE-enabled port. In another embodiment, the power management circuitry 138 for multiple ports may be integrated together into one or more multi-port integrated power managers 200. One example of such a multi-port integrated power manager 200 is described below in relation to FIG. 2.

In an alternate design, instead of the intelligent load reduction signal being provided by the controller 136, the intelligent load reduction signal may be provided directly from the CPLD 134 to the power management circuitry 138 of the PoE-enabled ports.

Upon assertion of the intelligent load reduction signal, the power management circuitry 138 for the PoE-enabled ports very rapidly shuts off power to pre-configured "lower priority" ports. Meanwhile, pre-configured "higher priority" PoE-enabled ports would continue to output power.

The pre-configuration of which ports are lower priority and which ports are higher priority may be accomplished beforehand by programming a pre-designated priority bit in the power management circuitry 138 for each PoE-enabled port. In order to ensure rapid system response, the programming of priority bits is performed in advance of a power supply failure, so that the system 100 is poised or primed to respond correctly and rapidly when a failure event occurs.

Management software at the system management processor 112 may be programmed with an algorithm to determine which PoE-enabled ports are "higher priority" and which are "lower priority". For example, consider a system 100 with four supplies 102 of equal capacity. If C is the capacity per supply, then the maximum power level would be 4C. A secondary power level would be determined based on the failure of one of the supplies. In this case, the secondary power level would be 3C. Based on the secondary power level of 3C, only a certain number of "higher priority" PoE-enabled ports may be safely supplied power by the system 100. The algorithm uses the secondary power level to calculate a maximum number of ports in the higher priority state and may use other factors to specifically identify the higher and lower priority ports. For a system 100 with supplies 102 of differing capacities, the power-fail algorithm may assume that the working supply with the highest capacity will be the next supply to fail in determining the secondary power level.

In accordance with an embodiment of the invention, the load on the power supplies 102 may be rapidly decreased in an intelligent manner in response to a failed power supply. In other words, the system 100 is poised or primed so as to directly and rapidly drive the hardware to turn off pre-designated lower-priority ports in the event of an indicated supply fault. Because the system 100 is pre-configured in this way, the time taken to shut off power to the pre-specified lower priority ports may be performed in less than a microsecond. In comparison, a prior system uses a microcontroller to write into registers on a per-port basis to turn each lower priority port off. In the prior system, using an I2C (inter integrated circuit) bus at 400 KHz, each instruction to write a register to turn off an individual port takes tens of microseconds, so that the total latency to turn off hundreds of ports may take on the order of milliseconds.

After the failure event and the shutting off of power to the pre-designated lower-priority ports, the blade management microprocessor 132 may cause the CPLD 134 to force the DC_POWER_GOOD signal false. In this system implementation, the false state for the DC_POWER_GOOD signal enables management software to reconfigure or reassign the aforementioned priority bits for the PoE-enabled ports.

The new priority bit assignments may be based a new secondary power level that would be defined for the failure of another power supply 102. In other words, additional PoE-enabled ports may be designated as lower priority to be shut-off in the event of another supply fault.

For example, consider a system 100 with four supplies 102 of equal capacity, where one supply has already failed. If C is the capacity per supply, then the new maximum power level would be 3C, and the new secondary power level would be 2C. Based on the new secondary power level of 2C, only a certain number of "higher priority" PoE-enabled ports may be safely supplied power by the system 100. The algorithm uses the secondary power level to calculate the maximum number of ports that may be higher priority ports and may use other factors to specifically identify the higher priority ports. For a system 100 with supplies 102 of differing capacities, the power-fail algorithm may assume that the remaining working supply with the highest capacity will be the next supply to fail in determining the secondary power level.

Once this reconfiguration is complete, the BMP 132 may assert the DC_POWER_GOOD signal, and send a message to the SMP 112 that the BMP 132 is ready to assume the new power allocation state. The SMP 112 would mask the failed power supply from asserting a PS_FAULT signal, then clear the 50V_FAULT signal so the system 100 would return to normal operation at the new primary and secondary power allocation levels.

The above discussed approach may be considered as a type of N+1 configuration. In the N+1 configuration, power from N+1 supplies is available, but only N supplies are budgeted for redundancy. In other words, power is redundantly available only to the higher priority ports based on the capacity of the N supplies.

In an alternate approach, the system 100 may be configured as a type of N+N configuration. In the N+N configuration, for example, a first set of N supplies may be tied to a first power source line, and a second set of N supplies may be tied to a second power source line. Consider the case where the first power source line includes an uninterruptible power source (UPS), and the second power source comprises standard line power (no UPS). The system may then be configured such that in the event of a failure of the standard power line, power for the system would revert to the first set of N supplies that are powered by the UPS. The pre-configured lower priority ports may be rapidly shut off to reduce the load, while the pre-configured higher priority ports continued to be powered by the first set of N supplies.

In accordance with an embodiment of the invention, the system management processor 112 may be programmed to determine the available power, priorities, user preference for N+1 or N+N configurations, and then assign a power budget to each blade for normal and power-fail conditions. Priorities may be assigned by user input, with default priorities based on port number or some other scheme. The blade management processor 132 may be programmed to initialize the PoE-enabled ports and set the higher/lower priority levels for the ports, and signal to the SMP 112 that the blade 130 is ready and configured. Once all blades 130 have completed their initialization, the SMP 112 may issue a command message allowing them to begin authorizing power to their PoE-enabled ports.

Figure 2:
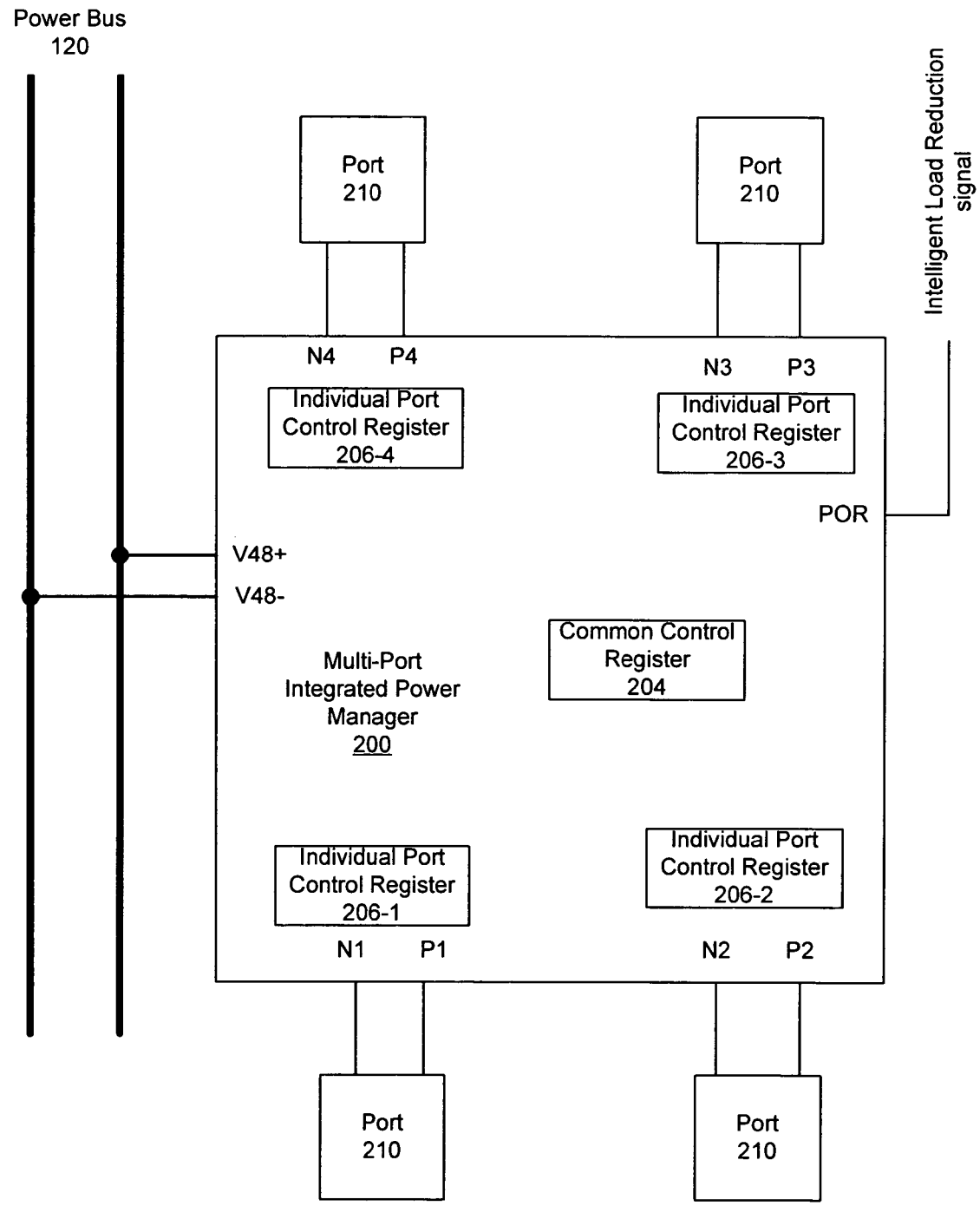
FIG. 2 is a schematic diagram depicting a multi-port integrated power manager in accordance with an embodiment of the invention.

FIG. 2 is a schematic diagram depicting a multi-port integrated power manager 200 in accordance with an embodiment of the invention. In one example, the port power managers 138 may be implemented using such multi-port integrated power managers 200. While a few of the more pertinent "pins" of the multi-port integrated power manager 200 is shown in FIG. 2, an actual implementation of such an integrated power manager 200 will have various other pins (for electrical ground, addressing, data, and so on) as would be known to those in the art.

The integrated power manager 200 shown in FIG. 2 is configured to draw power from the power bus 120. In this example, pins designated V48+ and V48− are shown as connected to the power bus 120 and are configured for receiving power at + and −48 volts into the integrated power manager 200. Four Ethernet Ports 210 are also shown as being coupled to the integrated power manager 200 via pairs of load sense (P) and return (N) pins. Of course, other implementations may include more or fewer than four ports. The ports 210 may comprise, for example, RJ45 jacks or other types of connectors.

In this example, the intelligent load reduction signal discussed above is shown as being received by a power-on-reset (POR) pin of the integrated power manager 200. The integrated power manager 200 may include a configuration bit in a common control register 204 therein that determines how the integrated power manager 200 responds to a signal on the POR pin. In one specific implementation, if the configuration bit is at a default zero (low) state, then the POR pin may be used for the conventional purpose of performing a power on reset of the integrated power manager 200. On the other hand, if the configuration bit is written to a one (high) state, then the POR pin may be used to perform an intelligent load reduction by resetting and shutting off power to only those ports which have been pre-designated as "lower priority" ports.

The integrated power manager 200 may also include an individual port control register 206 associated with each PoE-enabled port 210. Each individual port control register 206 may include a priority bit for the associated port 210. For example, if the priority bit is at a default zero (low) state, then the associated port may be defined to be "lower priority" port. On the other hand, if the priority bit is written to a one (high) state, then the associated port may be defined to be a "higher priority" port.

In one embodiment, a system may include management software that is configured to be able to shut off power to the PoE-enabled ports by way of a single global write to a specific register bit associated with each port. The global write may be communicated via an I²C (inter-integrated circuit) bus or similar communication mechanism. This capability may be used, for example, when the hardware signaling is not available, but the specific register bit is still accessible.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of rapidly reducing load for a power-over-ethernet system under fault conditions, the method comprising:

pre-configuring ports to either of a lower priority state or a higher priority state;

determining a secondary power level assuming failure of a power supply;

calculating a maximum number of ports to be in the higher priority state based on the secondary power level;

selecting specific ports to be in the higher priority state such that the number of ports in the higher priority state does not exceed the maximum number of ports;

receiving a load reduction signal; and performing the load reduction by rapidly shutting-off power to the ports in the lower priority state while maintaining power to the ports in the higher priority state, wherein failure of the power supply with a highest remaining capacity is assumed in determining the secondary power level.

2. The method of claim 1, further comprising:

receiving a power supply fault signal from a power supply to a controller on a system board; and transmitting a fault signal from the system board to blades including the ports of the system.

3. The method of claim 2, further comprising, after a blade receives the fault signal, transmitting the load reduction signal from a controller on the blade to at least one port power manager.

4. The method of claim 1, wherein the ports are pre-configured by programming priority data associated with each port.

5. The method of claim 1, wherein the system includes at least 100 ports.

6. The method of claim 5, wherein the power is shut-off to the lower priority ports in less than one millisecond.

7. A method of rapidly reducing load for a power-over-ethernet system under fault conditions, the method comprising:

pre-configuring ports to either of a lower priority state or a higher priority state;

determining a secondary power level assuming failure of a power supply;

calculating a maximum number of ports to be in the higher priority state based on the secondary power level;

selecting specific ports to be in the higher priority state such that the number of ports in the higher priority state does not exceed the maximum number of ports;

receiving a load reduction signal; and performing the load reduction by rapidly shutting-off power to the ports in the lower priority state while maintaining power to the ports in the higher priority state;

further comprising, after said load reduction:

re-determining the secondary power level assuming failure of another power supply;

re-calculating the maximum number of ports to be in the higher priority state based on the re-determined secondary power level; and re-selecting specific ports to be in the higher priority state such that the number of ports in the higher priority state does not exceed the recalculated maximum number.

8. A system for power distribution to network devices, the system comprising:

a plurality of ports enabled to supply power to network devices connected thereto;

priority data associated with each said port for assigning a priority state to the associated port;

circuitry configured to rapidly shut off power only to the ports with a lower priority state upon receiving a selective power reduction signal, while power to the ports with a higher priority state is maintained;

system management software configured to determine a secondary power level assuming failure of a power supply, calculate a maximum number of ports to be in the higher priority state based on the secondary power level, and select specific ports to be in the higher priority state such that the number of ports in the higher priority state does not exceed the maximum number, wherein the system management software is further configured to re-determine the secondary power level assuming failure of another power supply, re-calculate the maximum number of ports to be in the higher priority state based on the re-determined secondary power level, and re-select specific ports to be in the higher priority state such that the number of ports in the higher priority state does not exceed the re-calculated maximum number.

9. The system of claim 8, further comprising a system board configured to receive a power supply fault signal from a failed power supply and to transmit a fault signal to other boards including the ports of the system.

10. The system of claim 9, further comprising a controller on each of the other boards, wherein the controller is configured to transmit a selective load reduction signal to port power management circuitry upon receiving the fault signal.

11. The system of claim 10, wherein the port power management circuitry comprises at least one multi-port integrated power manager.

12. The system of claim 11, wherein the multi-port integrated power manager includes a register bit to indicate whether the selective power reduction is an activated feature.

13. The system of claim 12, wherein a pin of the power manager that receives the selective load reduction signal when the selective power reduction is activated is instead used to receive a power-on-reset signal when the selective power reduction is unactivated.

14. The system of claim 8, wherein the system includes management software configured to shut-off power to the ports by way of a global write via a communication bus to a specific register bit associated with each port.

* * * * *

UNITED STATES PATENT AND TRADEMARK OFFICE
CERTIFICATE OF CORRECTION

PATENT NO. : 7,340,620 B2  Page 1 of 1
APPLICATION NO. : 11/126479
DATED : March 4, 2008
INVENTOR(S) : Daniel Joseph Dove It is certified that error appears in the above-identified patent and that said Letters Patent is hereby corrected as shown below:

In column 8, line 61, in Claim 7, delete "recalculated" and insert -- re-calculated --, therefor.

Signed and Sealed this

Eighth Day of July, 2008

JON W. DUDAS
*Director of the United States Patent and Trademark Office*